(12) United States Patent
Piramuthu et al.

(10) Patent No.: US 8,670,615 B2
(45) Date of Patent: Mar. 11, 2014

(54) REFINEMENT OF SEGMENTATION MARKUP

(75) Inventors: Robinson Piramuthu, Oakland, CA (US); Kuang-chih Lee, Union City, CA (US); Daniel Richard Prochazka, Pacifica, CA (US)

(73) Assignee: FlashFoto, Inc., Oakland, CA (US)

( * ) Notice: Subject to any disclaimer, the term of this patent is extended or adjusted under 35 U.S.C. 154(b) by 210 days.

(21) Appl. No.: 12/924,705

(22) Filed: Sep. 30, 2010

(65) Prior Publication Data

US 2011/0075926 A1    Mar. 31, 2011

Related U.S. Application Data

(60) Provisional application No. 61/247,322, filed on Sep. 30, 2009.

(51) Int. Cl.
*G06K 9/34*    (2006.01)

(52) U.S. Cl.
USPC .......................................................... 382/173

(58) Field of Classification Search
None
See application file for complete search history.

(56) References Cited

U.S. PATENT DOCUMENTS

| | | | |
|---|---|---|---|
| 5,757,380 A * | 5/1998 | Bardon et al. | 345/629 |
| 5,832,055 A | 11/1998 | Dewaele | |
| 5,881,171 A | 3/1999 | Kinjo | |
| 5,930,391 A | 7/1999 | Kinjo | |
| 6,021,221 A | 2/2000 | Takaha | |
| 6,205,260 B1 | 3/2001 | Crinon et al. | |
| 6,549,646 B1 | 4/2003 | Yeh et al. | |
| 6,650,778 B1 | 11/2003 | Matsugu et al. | |
| 6,697,502 B2 | 2/2004 | Luo | |
| 6,757,442 B1 * | 6/2004 | Avinash | 382/274 |
| 6,834,127 B1 | 12/2004 | Yamamoto | |
| 6,965,693 B1 | 11/2005 | Kondo et al. | |
| 7,162,082 B2 | 1/2007 | Edwards et al. | |
| 7,352,900 B2 | 4/2008 | Yamaguchi et al. | |
| 7,391,906 B2 | 6/2008 | Blake et al. | |
| 7,436,981 B2 | 10/2008 | Pace | |
| 7,526,131 B2 | 4/2009 | Weber | |
| 7,613,355 B2 | 11/2009 | Hirano | |
| 7,676,081 B2 | 3/2010 | Blake et al. | |
| 7,711,146 B2 | 5/2010 | Tu et al. | |
| 7,738,725 B2 | 6/2010 | Raskar et al. | |

(Continued)

FOREIGN PATENT DOCUMENTS

JP    2005339522 A    12/2005

OTHER PUBLICATIONS

Wang et.al. "Soft scissors: an interactive tool for real time high quality matting", ACM Transactions on Graphics, Proceedings of the SIGGRAPH Conference, vol. 26, issue 3, Jul. 2007.*

(Continued)

*Primary Examiner* — Bhavesh Mehta
*Assistant Examiner* — Feng Niu

(57) ABSTRACT

Systems for refinement of a segmentation of an image using spray-paint markup are disclosed, with methods and processes for making and using the same. Spray-paint markup allows for easy markup of errors in a segmentation. The markup's data may be correlated or harmonized with the representation of the segmentation, such that it may be applied to the segmentation. The markup's data is utilized to refine the segmentation errors. To assist in the refinement process, the resolutions may be scaled down so as to exert less computation burden during the process.

17 Claims, 16 Drawing Sheets

(56) References Cited

U.S. PATENT DOCUMENTS

| | | | |
|---|---|---|---|
| 7,822,272 B2 | 10/2010 | Lei | |
| 7,995,841 B2 | 8/2011 | Lin et al. | |
| 8,041,081 B2 | 10/2011 | Hu | |
| 8,094,928 B2 | 1/2012 | Graepel et al. | |
| 8,149,236 B2 | 4/2012 | Nakao et al. | |
| 8,165,407 B1 | 4/2012 | Khosla et al. | |
| 8,194,974 B1 | 6/2012 | Skirko | |
| 2002/0071131 A1 | 6/2002 | Nishida | |
| 2002/0154828 A1* | 10/2002 | Kobilansky et al. | 382/254 |
| 2002/0164074 A1 | 11/2002 | Matsugu et al. | |
| 2003/0095701 A1 | 5/2003 | Shum et al. | |
| 2003/0103682 A1 | 6/2003 | Blake et al. | |
| 2003/0144585 A1 | 7/2003 | Kaufman et al. | |
| 2004/0004626 A1* | 1/2004 | Ida et al. | 345/626 |
| 2004/0131236 A1 | 7/2004 | Chen et al. | |
| 2004/0179233 A1 | 9/2004 | Vallomy | |
| 2004/0212725 A1 | 10/2004 | Raskar | |
| 2004/0264767 A1* | 12/2004 | Pettigrew | 382/162 |
| 2005/0008248 A1 | 1/2005 | Wang | |
| 2005/0027896 A1 | 2/2005 | Mairs et al. | |
| 2005/0196024 A1 | 9/2005 | Kuhnigk | |
| 2005/0259280 A1 | 11/2005 | Rozzi | |
| 2006/0029275 A1 | 2/2006 | Li et al. | |
| 2006/0233448 A1 | 10/2006 | Pace et al. | |
| 2006/0251322 A1 | 11/2006 | Palum et al. | |
| 2006/0269111 A1 | 11/2006 | Stoecker et al. | |
| 2007/0013813 A1* | 1/2007 | Sun et al. | 348/587 |
| 2007/0247679 A1* | 10/2007 | Pettigrew et al. | 358/518 |
| 2007/0297645 A1 | 12/2007 | Pace et al. | |
| 2008/0002890 A1* | 1/2008 | Hu | 382/203 |
| 2008/0089609 A1 | 4/2008 | Perlmutter et al. | |
| 2008/0123945 A1 | 5/2008 | Andrew et al. | |
| 2008/0136820 A1* | 6/2008 | Yang et al. | 345/440 |
| 2008/0137979 A1 | 6/2008 | Perlmutter et al. | |
| 2008/0292194 A1 | 11/2008 | Schmidt et al. | |
| 2009/0010539 A1 | 1/2009 | Guarnera et al. | |
| 2009/0060297 A1 | 3/2009 | Penn et al. | |
| 2009/0087089 A1 | 4/2009 | Hu | |
| 2009/0129675 A1 | 5/2009 | Eggert et al. | |
| 2009/0148041 A1 | 6/2009 | Piramuthu | |
| 2009/0190815 A1 | 7/2009 | Dam et al. | |
| 2009/0315910 A1* | 12/2009 | Kambhamettu et al. | 345/589 |
| 2010/0008576 A1 | 1/2010 | Piramuthu | |
| 2010/0061628 A1 | 3/2010 | Yamada | |
| 2010/0150423 A1 | 6/2010 | Hong et al. | |
| 2010/0171740 A1* | 7/2010 | Andersen et al. | 345/424 |
| 2010/0232685 A1 | 9/2010 | Yokokawa et al. | |
| 2010/0316288 A1 | 12/2010 | Ip et al. | |
| 2011/0096228 A1 | 4/2011 | Deigmoeller et al. | |

OTHER PUBLICATIONS

Boykov et al., Graph Cuts and Efficient N-D Image Segmentation, International Journal of Computer Vision 70(2), 109-131, 2006.*

Chuang et al., A Bayesian Approach to Digital Matting, Proc. of IEEE CVPR, pp. 264-271, 2001.*

Foley, Computer Graphics: Principles and Practice, Addison-Wesley Professional, p. 13, ISBN 0201848406, 1995.

Grady et al., Random Walks for Interactive AlphaMatting, Visualization, Imaging, and Image Processing: Fifth IASTED International Conference Proceedings, pp. 1-7, 2005.

Comaniciu, Mean Shift: A Robust Approach Toward Feature Space Analysis, IEEE Transactions on Pattern Analysis and Machine Intelligence, 24, pp. 603-619, 2002.

Li Y. et al., Lazy snapping, ACM Transactions on Graphics, special issue: Proceedings of the SIGGRAPH Conference, pp. 303-308, 2004.

Pachghare, Comprehensive Computer Graphics: Including C++, Laxmi Publications, p. 93, ISBN 8170081858, 2005.

Russ, Chapter 6- Segmentation and Thresholding, The Image Processing Handbook, 4th Ed., pp. 333-381, 2002.

\* cited by examiner

REFINEMENT OF SEGMENTATION MARKUP

CROSS REFERENCE TO RELATED APPLICATION

This application claims priority to U.S. provisional patent application No. 61/247,322, filed Sep. 30, 2009, which is hereby incorporated by reference herein in its entirety.

BACKGROUND

The goal of most image segmentations is to distinguish or separate an object or objects, often referred to as the "figure" or "foreground", from the rest of the image. The rest of the image is often referred to as "background" or "ground." To perform the segmentation process, an image mask or "mask" is generally utilized. Masking figural objects or subjects from an image is an important application and has been a laborious task for decades. Some have attempted to simplify the masking process by utilizing techniques that would assist in distinguishing the background from the foreground, such as photographing foreground objects against a uniform colored background and then selecting any pixels within the image that are that color as background. This approach is still in use by many within the movie and television industries.

Other more laborious approaches include marking up one pixel at a time using commercial software such as Photoshop. In recent years, such commercial applications have implemented approaches to reduce burden on users by power-assist methods. Examples of power-assist methods in Photoshop are: "lasso"; "magnetic-lasso"; "magic wand"; and "quick-select". Some applications, such as the PhotoShop plug-in Fluid Mask, allow user to select JigCut regions (as defined later). The concept is to allow users to select macro regions instead of micro pixels.

The next level of ease-of-use dawned with the introduction of tri-maps. A tri-map is an image where the figure, ground and other unknown regions are assigned unique labels. A PhotoShop plug-in called Knockout requires the user to provide an accurate tri-map. An application called GrowCut expects user to define a rough region (say, a rectangle) that completely contains the figural subject and then requires user to select samples of figure and ground inside that rough region by means of scribbles. Scribbles are derived from the trajectory of mouse, or equivalent hardware such as marking the figure and the ground samples by scribbling with a pen or brush.

Lazy Snapping (as proposed by, "Lazy snapping", Y. Li, J. Sun, C. Tang, H. Shum, ACM Transactions on Graphics, special issue: Proceedings of the SIGGRAPH Conference, pp. 303-308, 2004.) requires users to select figure and ground seeds using scribbles, without the need to mark rough region that encompasses the figural object. It approximates the figure region into a polygon and allows the user to adjust the vertices to refine the resulting mask to correct for segmentation error due to low contrast regions.

Soft Scissors (as proposed by, "Soft scissors: an interactive tool for real time high quality matting", ACM Transactions on Graphics, Proceedings of the SIGGRAPH Conference, vol. 26, issue 3, July 2007.) requires users to roughly trace the contour of boundary and adapts the brush size based on local variation. It uses a restricted form of scribbles in that the scribbles follow the contour, and the figure and ground seeds are selected from outside the scribble region.

As seen from above, several approaches exist for addressing the masking process but with different and difficult variations of user interaction. As should be apparent, there is need for a solution that provides a simple and user-friendly interface for the creation or refinement of an image mask.

SUMMARY

The following presents a simplified summary of the disclosure in order to provide a basic understanding to the reader. This summary is not an extensive overview of the disclosure and it does not identify key/critical elements of the embodiments disclosed nor delineate the scope of the disclosed embodiments. Its sole purpose is to present some concepts disclosed herein in a simplified form as a prelude to the more detailed description that is presented later.

Image segmentation is often an imperfect process that requires user input to assist in creating a successful result. Providing an easy and user-friendly interface for accepting the user input, the "spray paint" markup allows errors in the segmentation to quickly be selected for correction. Utilizing information from the original image, a segmentation of the image, and the spray paint markup, a successful refinement of the segmentation may be had. The spray paint markup information or data may be converted or otherwise harmonized to apply to the segmentation data. Once the spray paint markup information is applicable to the segmentation data, the segmentation of the image can be refined.

In one embodiment, image data, data representing a segmentation of the image, and data representing the markup of the image are correlated or harmonized. The data representing a segmentation of the image is then refined to produce a successful segmentation of the image.

In another embodiment, the image, and a binary mask representing a segmentation of the image (also referred to as "segmentation binary mask") are utilized to assist in gathering data from a user's spray paint markup of the segmentation. The spray paint markup data is then converted to a binary mask (referred to as "binary markup mask"). The binary markup mask is then applied to the binary mask representing a segmentation of the image. This application allows for refinement of the binary mask representing a segmentation of the image.

In an additional embodiment, the segmentation binary mask is refined by first optionally scaling down the resolutions of the image, segmentation binary mask, and/or the binary markup mask. Gross errors are located in the segmentation and pixels in the gross errors are reclassified correctly. Other pixels that remain in the markup are also refined accordingly. Extraneous pixel regions or blobs in the segmentation binary mask are removed. If the resolution was scaled down previously, it is then also scaled back up which may require additional refinement to pixels of uncertainty created from the scaling process. A smoothing technique may also be applied to the boundary contours of the segmentation binary mask.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

Figure 1:
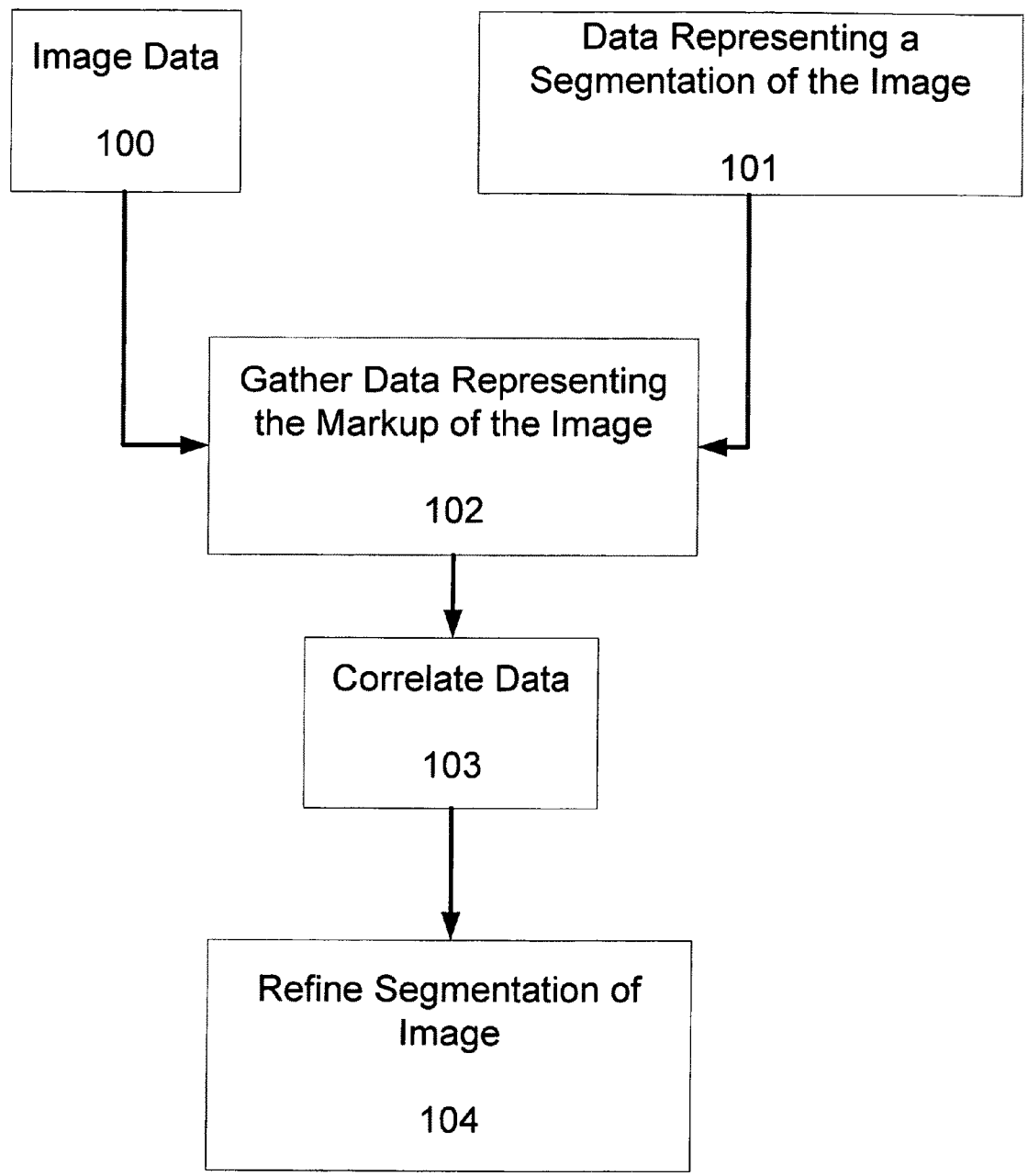
FIG. 1 is a diagrammatic illustration of a system, process or method for refinement of segmentation using spray-paint markup, according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

Systems for refinement of segmentation using spray-paint markup are disclosed, with methods and processes for making and using the same.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within computer memory. These process descriptions and representations are the means used by those skilled in the data processing arts to most effectively convey the substance of their work to others skilled in the art. A process is here, and generally, conceived to be a self-consistent sequence of sub-processes leading to a desired result. These sub-processes are those requiring physical manipulations of physical quantities.

The physical quantities manipulated by sub-processes usually, though not necessarily, take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "rasterizing" or "gathering" or "converting" or "segmenting" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the inventions as described herein.

The invention involves the manipulation of images, which in some embodiments are stored as bitmapped or pixmapped images or other data formats. As used herein, a bitmap or pixmap is a type of memory organization or image file format used to store digital images.

Images may be compressed or stored in alternative formats, such as vector images. Examples of image formats include, but are not limited to, Windows bitmap, JPEG, TIFF, PNG, and GIF. More disclosure on bitmap images is found in Foley, 1995, Computer Graphics: Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety. While images may be stored in a variety of formats, processes described herein are described as transformations on images in an uncompressed state.

In a typical uncompressed bitmap, the pixel intensity of each color band is stored as a memory unit such as a byte. An RGB image would therefore have three bytes for every color pixel. High dynamic range images may have multiple bytes per color band. An alpha channel, for transparency, may also be stored as a bitmap, either as a fourth channel or a separate file.

Some embodiments disclosed below create a mask, often stored as an alpha channel. In computer graphics, when a given image or portion of an image (or figure) is intended to be placed over another image (or background), the transparent areas can be specified through a binary mask. For each intended composite image there are three bitmaps: the image containing the figure, the background image and an additional mask, in which the figure areas are given a pixel value of all bits set to 1's and the surrounding areas a value of all bits set to 0's. The mask may be nonbinary when blending occurs between the figure and its surroundings.

To put the figure image over the background, the program may first mask out the ground pixels in the figure image with the binary mask by taking a pixel by pixel product of the two bitmaps. This preserves the figure pixels. Another product is performed between the inverse of the binary mask and the background, removing the area where the figure will be placed. Then, the program may render the final image pixels by adding the two product results. This way, the figure pixels are appropriately placed while preserving the background. The result is a compound of the figure over the background. Other blending techniques may be used to blend the figure with the new background, such as smoothing at the figure mask boundary.

Figure mask may be produced by segmenting the figure region from the background. In computer vision, segmentation refers to the process of partitioning a digital image into multiple regions. The pixels in a region share similar characteristics or computed properties. They may be similar in color and intensity, or be part of a larger texture or object. Adjacent regions are significantly different with respect to the same characteristic(s).

Several general-purpose processes and techniques have been developed for segmenting images into regions based on pixel characteristics, such as watershed and mean-shift. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose.

FIG. 1 is a diagrammatic illustration of a system, process or method for refinement of segmentation using spray-paint markup, according to one embodiment of the present invention. In this embodiment, data representing the markup of an image is gathered at 102 by utilizing image data inputted at 100 and data representing a segmentation of the image inputted at 101. In an embodiment, the data representing a segmentation of the image at 101 comprises the image data at 100.

The data from 100, 101, and 102 is correlated or harmonized at 103. Such correlation or harmonization operation can comprise any conventional type of correlation or harmonization operation, such as converting one or more sets of data to be compatible to one or more other sets of data. For example, in one embodiment of correlating or harmonizing the data, the data representing the markup of the image at 102 would be converted such that it may be compared with the image data at 100. In another embodiment, the image data at 100 is correlated or harmonized with the data representing the markup of the image at 102. In another additional embodiment, the data representing a segmentation of the image at 101 is converted such that it is correlated or harmonized with the data representing the markup of an image at 102. As should be apparent, it is within the scope of this disclosure that each data at 100, 101, and 102 may be correlated or harmonized with each other by converting any of the data or any combination of the data. The segmentation of the image is refined at 104 by utilizing the image data, data representing a segmentation of the data, and data representing the markup of an image, with the embodiment resulting in a refined image segmentation.

Figure 2:
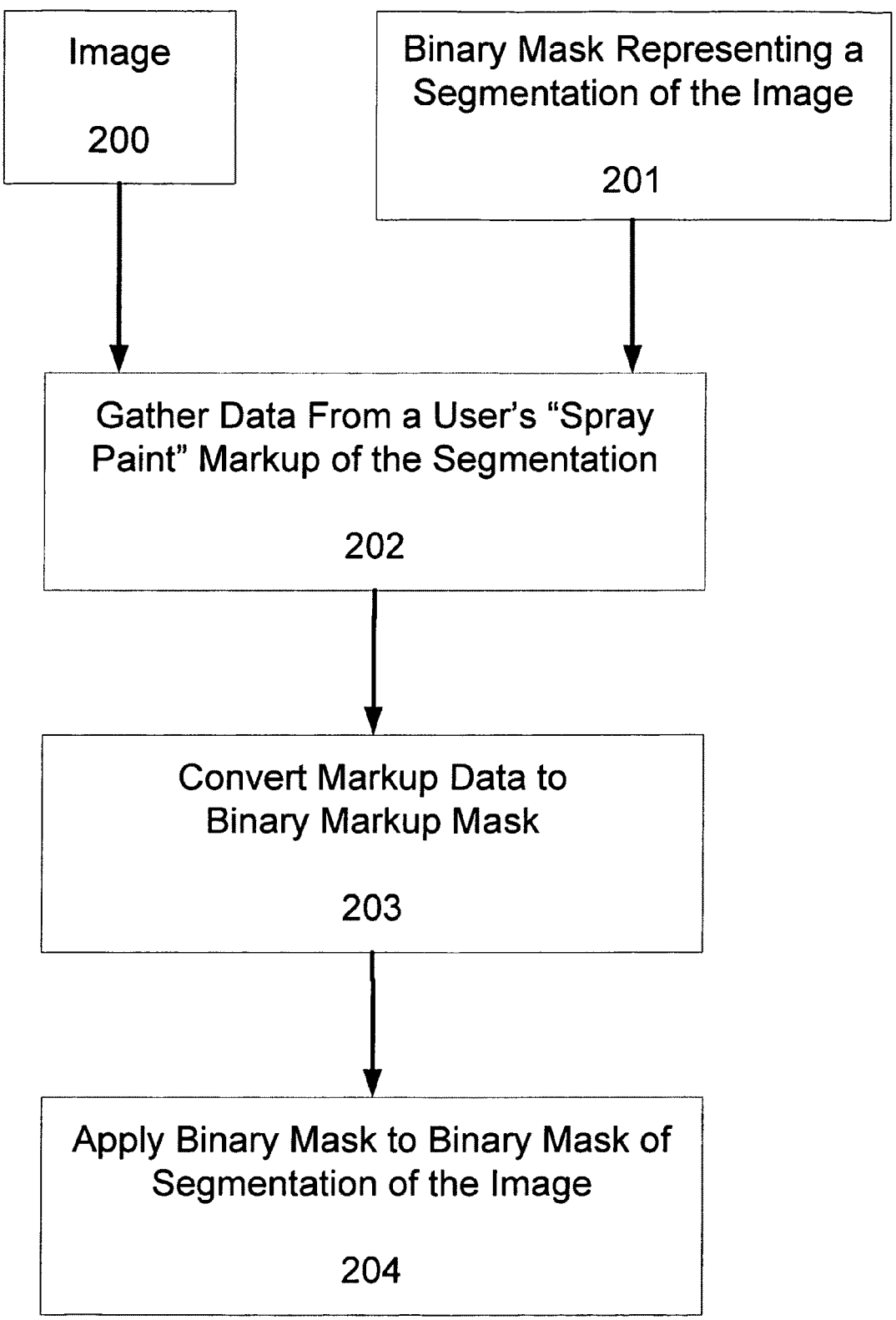
FIG. 2 is a diagrammatic illustration of a system, process or method for refinement of segmentation using spray-paint markup, according to an additional embodiment of the present invention.
Figure 3:
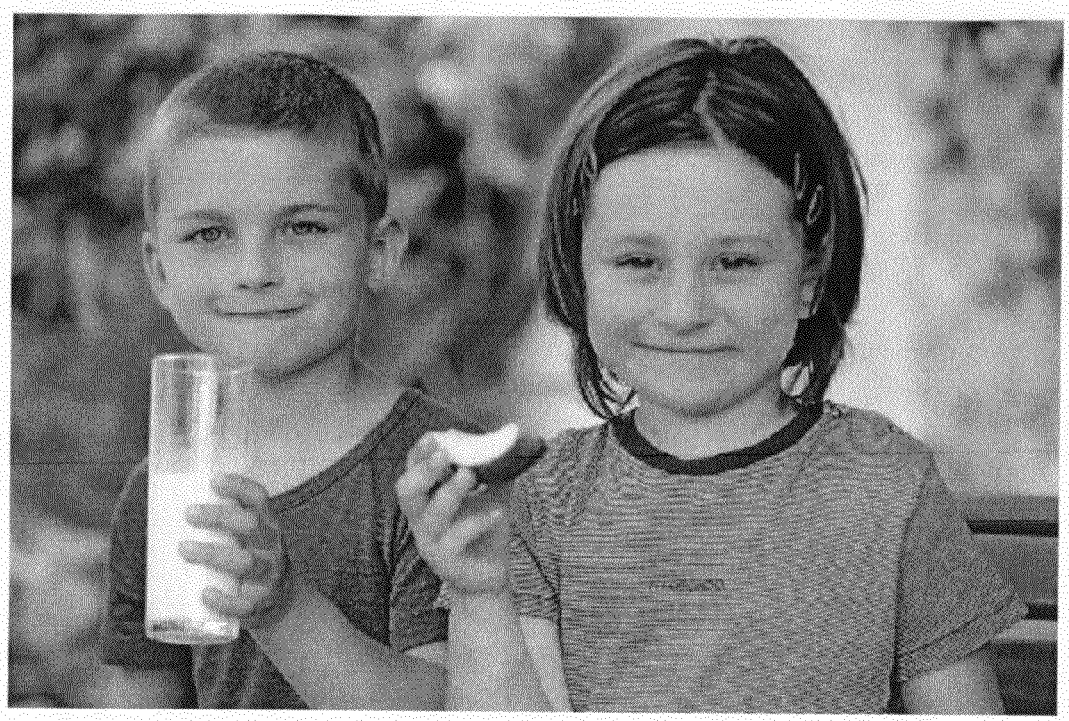
FIG. 3 is a sample color image presented in gray scale utilized to illustrate the processes and sub-processes of the exemplary embodiment diagrammatically illustrated in FIG. 2.
Figure 4:
FIG. 4 is an illustration of a binary mask representing the segmentation of the sample color image presented in gray scale in FIG. 3.

FIG. 2 is a diagrammatic illustration of a system, process or method for refinement of segmentation using spray-paint markup, according to an additional embodiment of the present invention. In this embodiment, an image at 200 and a binary mask representing a segmentation of the image (also referred to as "segmentation binary mask") at 201 are utilized to allow for a markup of the binary mask representing a segmentation of the image at 202. FIG. 3 is a sample color image presented in gray scale utilized to illustrate the processes and sub-processes of the exemplary embodiment diagrammatically illustrated in FIG. 2. FIG. 4 is an illustration of a binary mask representing the segmentation of the sample color image presented in gray scale in FIG. 3. The markup at 202 may comprise any conventional type of markup, such as allowing one to "spray paint" points, areas, or regions to draw attention or request correction.

Figure 5:
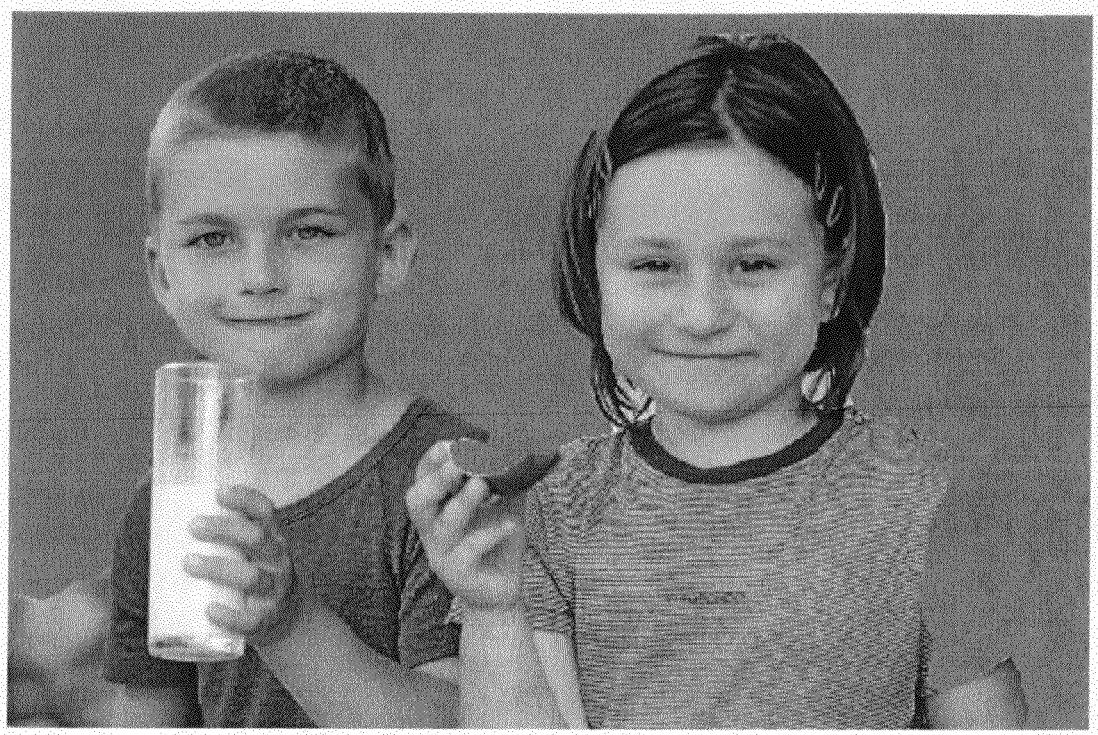
FIG. 5 is an illustration of the binary mask of FIG. 4 with the image data displayed in gray scale for the pixels selected by the segmentation.
Figure 6:
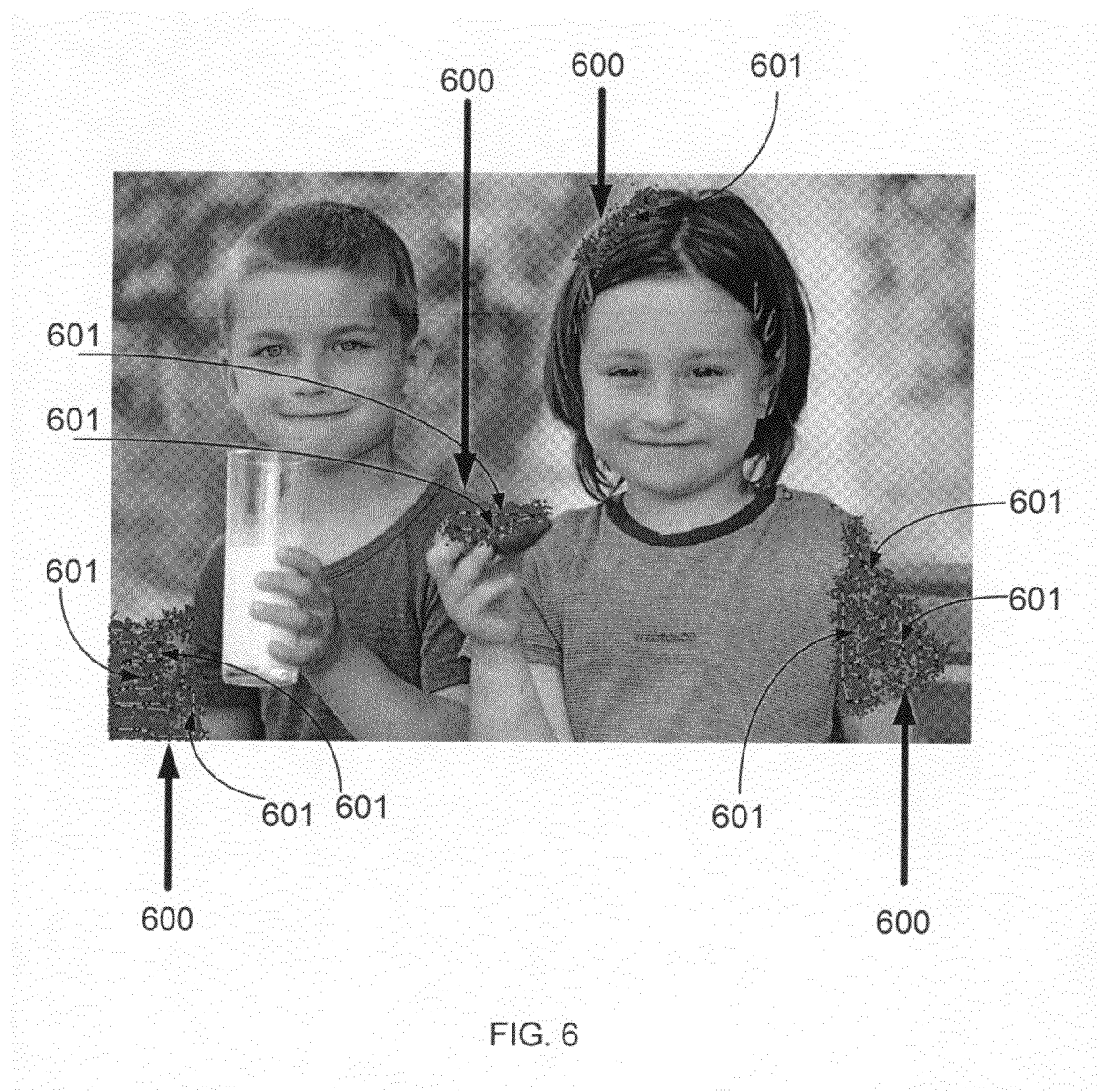
FIG. 6 is the illustration of FIG. 5 with spray painted areas indicating locations that the segmentation needs refinement presented in gray scale.

"Spray paint" may represent the ability of a user to utilize a computer mouse, or other pointing device, to spray points, areas or regions of an image or a mask. Spray painting may be used by the user to indicate that corrections in the segmentation are requested in the general spray painted parts or sections. FIG. 5 is an illustration of the binary mask of FIG. 4 with the image data displayed in gray scale for the pixels selected by the segmentation. FIG. 6 is the illustration of FIG. 5 with spray painted areas indicating locations that the segmentation needs refinement presented in gray scale. The spray painted areas are located at 600. Optionally, data or information from the original image may be viewed for areas not included in the binary mask to assist with the spray paint region selection. For example, FIG. 6 displays FIG. 5 with a transparency of the original image to assist with the spray paint region selection.

As seen in the embodiment illustrated in FIG. 2, the markup data is converted to a binary markup mask at 203. Some of the samples along the trajectory of the mouse (or equivalent device) are found at 601 of FIG. 6. In one embodiment, the samples along trajectory are used to convert the markup data into or derive a binary markup mask. Samples along the trajectory may be grouped to identify different regions. For example, grouping may be done at the user level by asking the user to markup regions one at a time, grouping may be based on the distance between samples of the trajectory, or grouping may be based on temporal information. For example, temporal information can be represented by the sample density along the mouse (or equivalent device) trajectory. This information could be used to decide if the user marked the region carefully or not by, as an example, determining that if the user moved the mouse slower, it is likely the user was careful during the markup.

Figure 7:
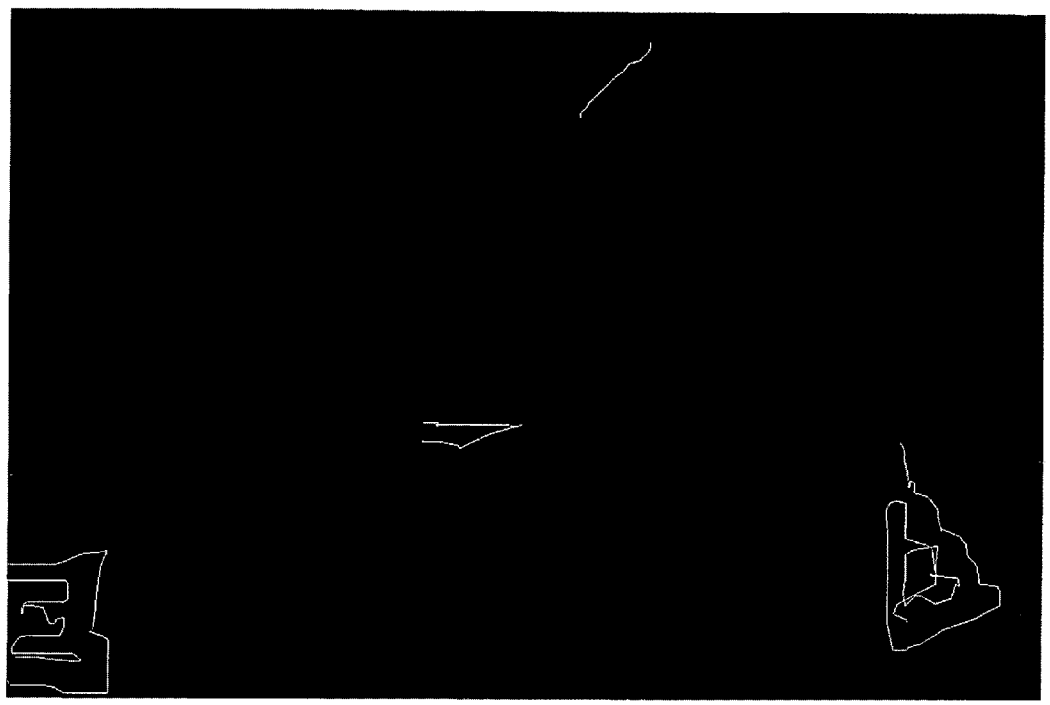
FIG. 7 is the binary trajectory mask created from the illustration of FIG. 6.
Figure 8:
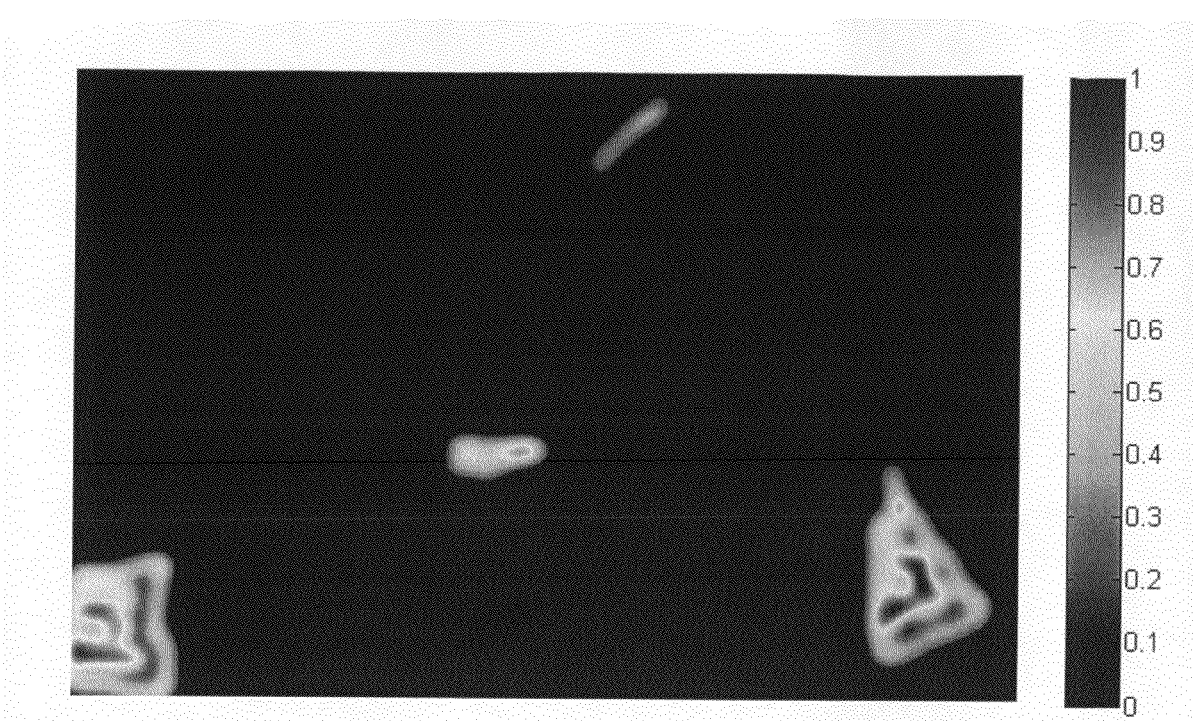
FIG. 8 is the fuzzy markup mask with a range bar both presented in gray scale and created by smoothing the binary trajectory mask of FIG. 7 by utilizing the width of the isotropic spray and a Gaussian model.
Figure 9:
FIG. 9 is a binary markup mask created utilizing the fuzzy markup mask of FIG. 8.
Figure 10:
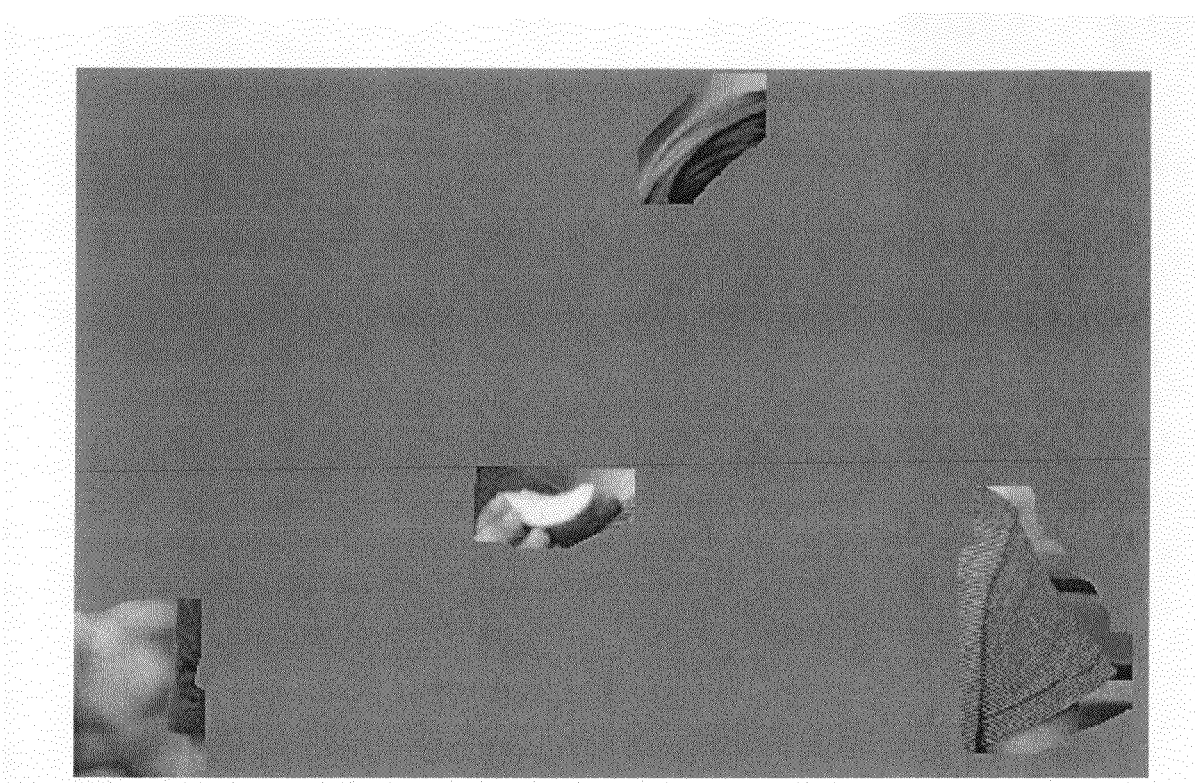
FIG. 10 is the binary markup mask illustrated in FIG. 9 with the image data displayed in gray scale for the pixels enabled.

The samples in each region may be connected by straight lines and converted to a binary image to create a binary trajectory mask. This may be performed by rasterization of the markup trajectory. FIG. 7 is the binary trajectory mask created from the illustration of FIG. 6. The binary trajectory mask may then be smoothed by utilizing the width of the isotropic spray used during the markup and applying a Gaussian model to simulate the spray painting along the binary trajectory mask to produce a fuzzy markup mask. FIG. 8 is the fuzzy markup mask with a range bar both presented in gray scale and created by smoothing the binary trajectory mask of FIG. 7 by utilizing the width of the isotropic spray and a Gaussian model. A binary markup mask may be created or derived by enabling all the positive pixels in the fuzzy markup mask. In an additional embodiment, the binary markup mask is created or derived by creating a structural element in the shape of a circular disc to dilate the binary trajectory mask. FIG. 9 is a binary markup mask created utilizing the fuzzy markup mask of FIG. 8. FIG. 10 is the binary markup mask illustrated in FIG. 9 with the image data displayed in gray scale for the pixels enabled.

Figure 11:
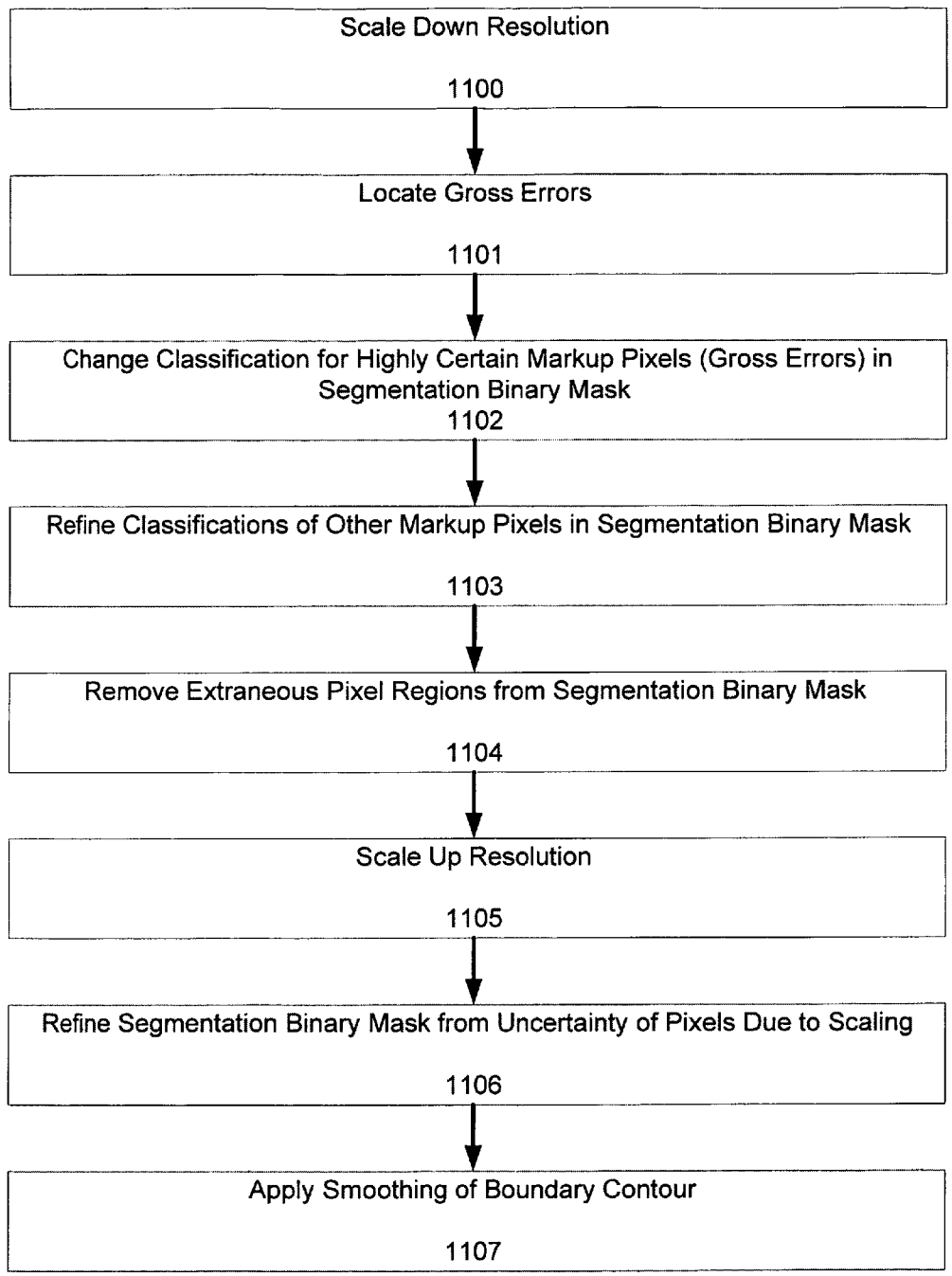
FIG. 11 is diagrammatic illustration of application of the binary markup mask to the binary mask of segmentation of the image with the goal of refining the segmentation binary mask, according to one embodiment.

At 204 of FIG. 2, the binary markup mask is applied to the binary mask of segmentation of the image. FIG. 11 is diagrammatic illustration of application of the binary markup mask to the binary mask of segmentation of the image with the goal of refining the segmentation binary mask, according to one embodiment. A parameter utilized within this embodiment shall be referred to as the "maximum radius of uncertainty." Uncertainty in the markup may be modeled as the sum of two quantities: (1) the width of the spray; and (2) the factoring of sloppiness or style of the user when performing the markup. Optionally, each of the quantities could be modeled independent Gaussian random processes with known parameters for higher cases of uncertainty. In the case of each quantity modeling independent Gaussian random processes, the resulting random variable is a Gaussian with the variance a sum of individual variances. The factoring of sloppiness or style of the user when performing the markup may be affected based on sample density along the trajectory. For example, one may deduce that a highly dense sample signifies that the user was more careful or the user considers the region more salient. In another example, one may deduce that a low density sample signifies that the user was less careful (i.e. more sloppy) or that the user does not consider the region less important. The factoring of the sloppiness or style of the user when performing the markup may also be affected based on the total length of the mouse (or similar device) or spray trajectory to traverse the intended or desired markup region. For example, if the spray trajectory is zigzagged (as opposed to a simple straight line), one can deduce that the slop factor is higher. This may be formulated by utilizing the ratio of the total length of the spray trajectory to the area of the markup region produced by this trajectory.

For example, the spray may be set to a Gaussian with standard deviation at one percent (1%) for the smallest dimension, and the maximum radius of uncertainty to be five percent (5%) of the smallest dimension of the image. In this example, the maximum radius of uncertainty for a 1000× 1500 image is 5% of 1000 (that is 50 pixels).

At 1100 of FIG. 11, the resolution of each the image, the segmentation binary mask, and the binary markup mask are optionally scaled down. Scaling down the resolutions may reduce the computational burden. If the resolutions are scaled down, the aspect ratio or ratios may be preserved.

Figure 12:
FIG. 12 is the binary markup mask of FIG. 10 where JigCut regions from the image are outlined by boundaries and overlaid on the binary markup mask, displayed in gray scale.

At 1101 of FIG. 11, gross errors are located by techniques or processes. The location of gross errors operation can comprise any conventional type of location operation, such as the utilization of JigCut region segmentation such as in the manner set forth in the pending U.S. patent application, entitled "Systems and Methods for Unsupervised Local Boundary or Region Refinement of Figure Masks Using Over and Under Segmentation of Regions," Ser. No. 12/333,293, filed on Dec. 11, 2008 which is assigned to the assignee of the present application and the disclosure of which is hereby incorporated herein by reference in its entirety. The image may be partitioned into JigCut regions as defined in the manner set forth in pending U.S. patent application, entitled "System and Method for Segmentation of an Image into Multi-scale Regions," Ser. No. 12/502,125, filed on Jul. 13, 2009 which is assigned to the assignee of the present application and the disclosure of which is hereby incorporated herein by reference in its entirety. Generally, and in no way provided to limit the present disclosure, locally coherent pixels that are grouped together form JigCut regions. FIG. 12 is the binary markup mask of FIG. 10 where JigCut regions from the image are outlined by boundaries and overlaid on the binary markup mask, displayed in gray scale. The JigCut regions may be created in a number of ways, including utilizing a Mean-shift process as defined in Mean shift: A robust approach toward feature space analysis", Comaniciu D., Meer P., IEEE Transactions on Pattern Analysis and Machine Intelligence, vol. 24, no. 5, pp. 603-619, May 2002, which is hereby incorporated herein by reference in its entirety.

Utilizing JigCut region segmentation, large areas may be handled for location. For example, in the case of a circular-disc brush, the area of the disc may define the maximum area of uncertainty. Optionally, only JigCut regions whose area exceeds the maximum area of uncertainty may be considered. A threshold for the percentage of markup within a JigCut region may be set to determine whether the JigCut region is a gross error. For example, a threshold could be set to indicate a gross error when at least 90% of pixels in a JigCut region are marked up.

In an additional embodiment, gross errors are located by utilizing information from the binary markup mask, such as the sizes of any overlapping regions and relative position between the "figure" in the segmentation binary mask and each connected region (regions sometimes referred to as "blob") of the binary markup mask. Where there are overlapping regions between the figure and each connected region of the binary markup mask, information may be deduced regarding whether the user preferred or intended to add, delete, or slightly refine a particular region when marked up. For example, if the ratio of the overlapped region between figure and the connected markup region is larger than a given high threshold, it may be deduced that the user wants to "delete" most of that particular markup region from the figure mask. Following this example, if the ratio of the overlapped region between figure and each connected markup region is smaller than a given low threshold, it may be deduced that the user wants to "add" most of this markup region to the figure mask. Lastly, if the ratio is in between the high and low thresholds, it means that this particular markup region has large uncertainty and will not be categorized as a gross error. As should be apparent, the threshold parameters may be set by any number of ways, including by cross-validation experiments.

Figure 13:
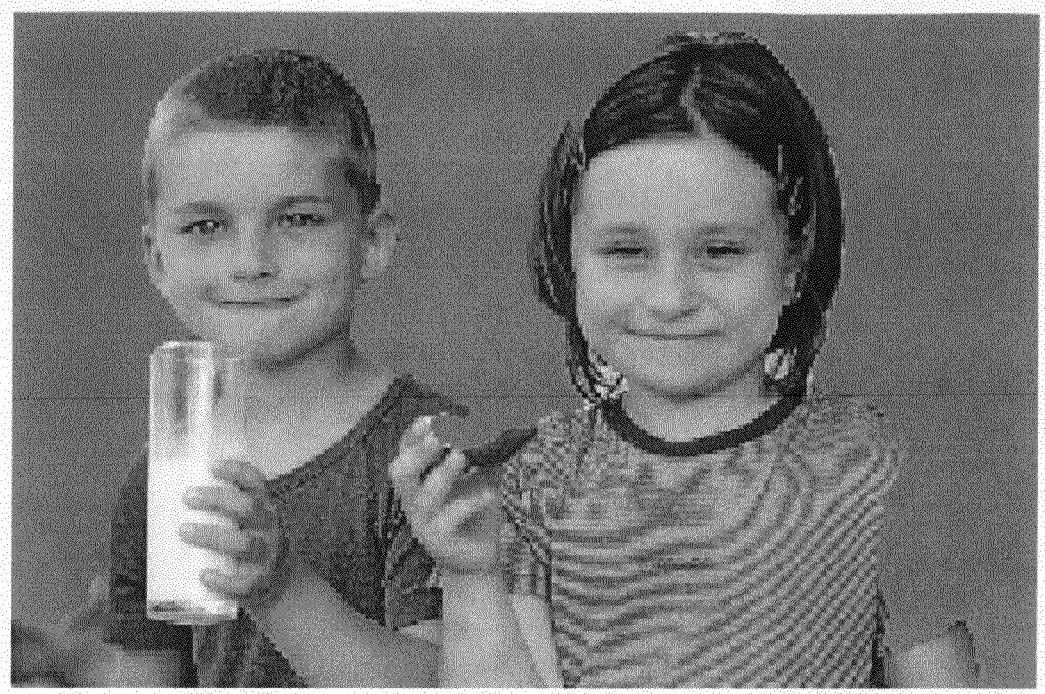
FIG. 13 is the resulting segmentation binary mask after the completion of JigCut region segmentation process as illustrated by FIG. 12.

At 1102 of FIG. 11, classification for highly certain markup pixels (as indicated by the locations of gross errors) are changed in the segmentation binary mask. This may be done in a number of ways including "flipping" the value of the relevant pixels from figure to ground, or vice versa. FIG. 13 is the resulting segmentation binary mask after the completion of JigCut region segmentation process as illustrated by FIG. 12. From the example above, if the data from the binary markup mask was deduced to "delete", the interior of the markup region and the markup area close to the ground region would be flipped to ground. If the data from the binary markup mask was deduced to "add", the interior markup region and the markup region close to the figure region would be flipped to figure. Optionally, any flipped pixel would be disabled such that no further refinement involving that pixel would occur.

In certain circumstances, the uncertainty in markup regions can constructively add up, such as when during the markup of legs of a standing person with legs slightly apart. The inverted V-shaped region between the legs down to the line connecting both feet has a potential to be in markup region when both legs are marked up. This is the region where markup uncertainty from each leg can add up constructively. Under this assumption, consider the interior of markup regions that are away from the closest boundary by the maximum radius of uncertainty. For example, if the maximum radius of uncertainty is 50 pixels, consider interior regions which are at least 50 pixels away from the closest boundary. These interior pixels are assumed to be 100% certain for markup, that is, the figure mask is incorrect for every interior pixel. In other words, the figure mask may be flipped for these interior pixels. A distance map is used to identify the interior markup pixels, such as Euclidean distance.

At 1103 of FIG. 11, classifications for the other markup pixels refine the segmentation binary mask utilizing refinement processes and techniques. The remaining markup pixels may be in thin areas, or otherwise, and they are highly uncertain due to the uncertainty in the model introduced by the width of spray and user sloppiness (as mentioned earlier). One such refining process is referred to as Random Walker as defined in "Random walks for image segmentation", L. Grady, IEEE Transactions on Pattern Analysis and Machine Intelligence (PAMI), vol. 28, issue 11, pp. 1768-1783, which is hereby incorporated herein by reference in its entirety. Generally, Random Walker assigns probabilities to each uncertain pixel and, by applying a threshold to these probabilities, the segmentation binary mask may be refined.

Optionally, at 1104 of FIG. 11, extraneous pixel regions are removed from the segmentation binary mask. These pixel regions may be referred to as "blobs" and may be identified by using connectivity analysis on the segmentation binary mask. The largest blob is treated as the primary blob. Other blobs that are too far away (based upon some threshold) from the primary blob are considered to be extraneous blobs and are rejected.

Optionally, at 1105 of FIG. 11, the resolution of the segmentation binary mask is scaled up. For example, the mask may be scaled up to the original dimensions. However, scaling up may introduce an uncertainty proportional to the scale factor since scaling down may have lost some details. At 1106, refinement of segmentation binary mask is processed due to the uncertain pixels created from scaling up. Random Walker may be utilized again to refine such pixels affected due to scaling up. The output from Random Walker is again thresholded to get a binary mask. The thresholding step may be skipped if a fine matting edge is desired.

Figure 14:
FIG. 14 is a refined segmentation binary mask from the segmentation binary mask from FIG. 4.
Figure 15:
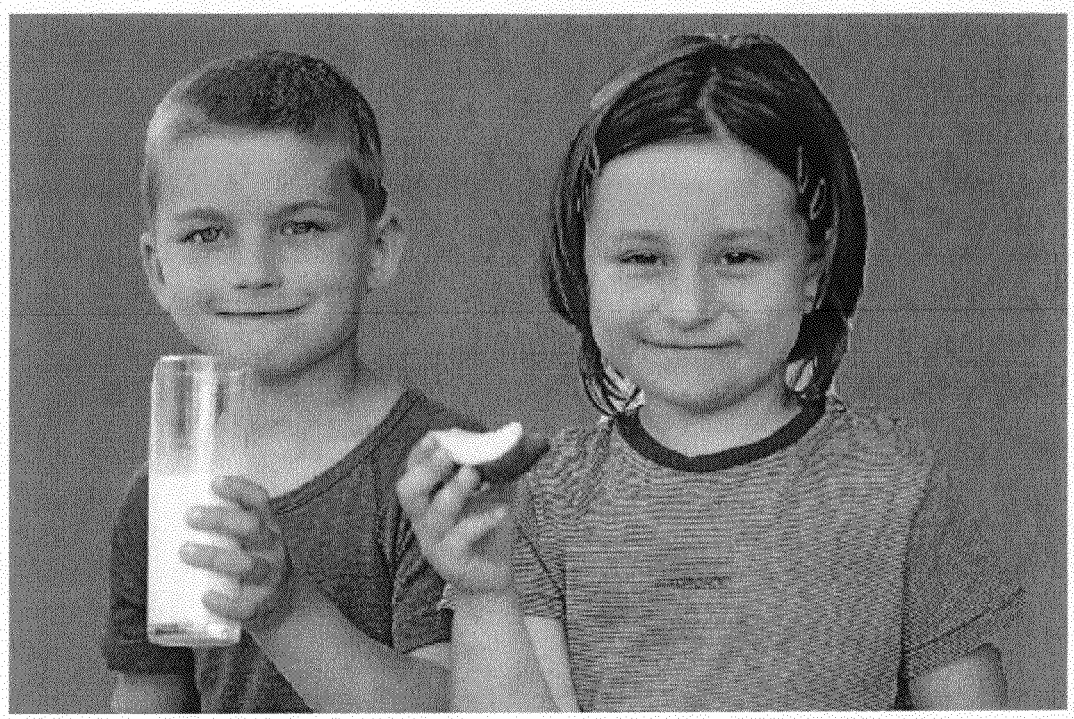
FIG. 15 is the refined segmentation binary mask from FIG. 14 with image data displayed accordingly.

Optionally, at 1107 of FIG. 11, a smoothing process may be applied to the segmentation binary mask's boundary contour. Masked images may be used to create memorabilia such as mugs, t-shirts, greeting cards, stickers, etc. For most of these applications, smooth edges may be desired. A multiple number of smoothing processes maybe utilized, including processing by smoothing spline. FIG. 14 is a refined segmentation binary mask from the segmentation binary mask from FIG. 4. FIG. 15 is the refined segmentation binary mask from FIG. 14 with image data displayed accordingly.

Figure 16:
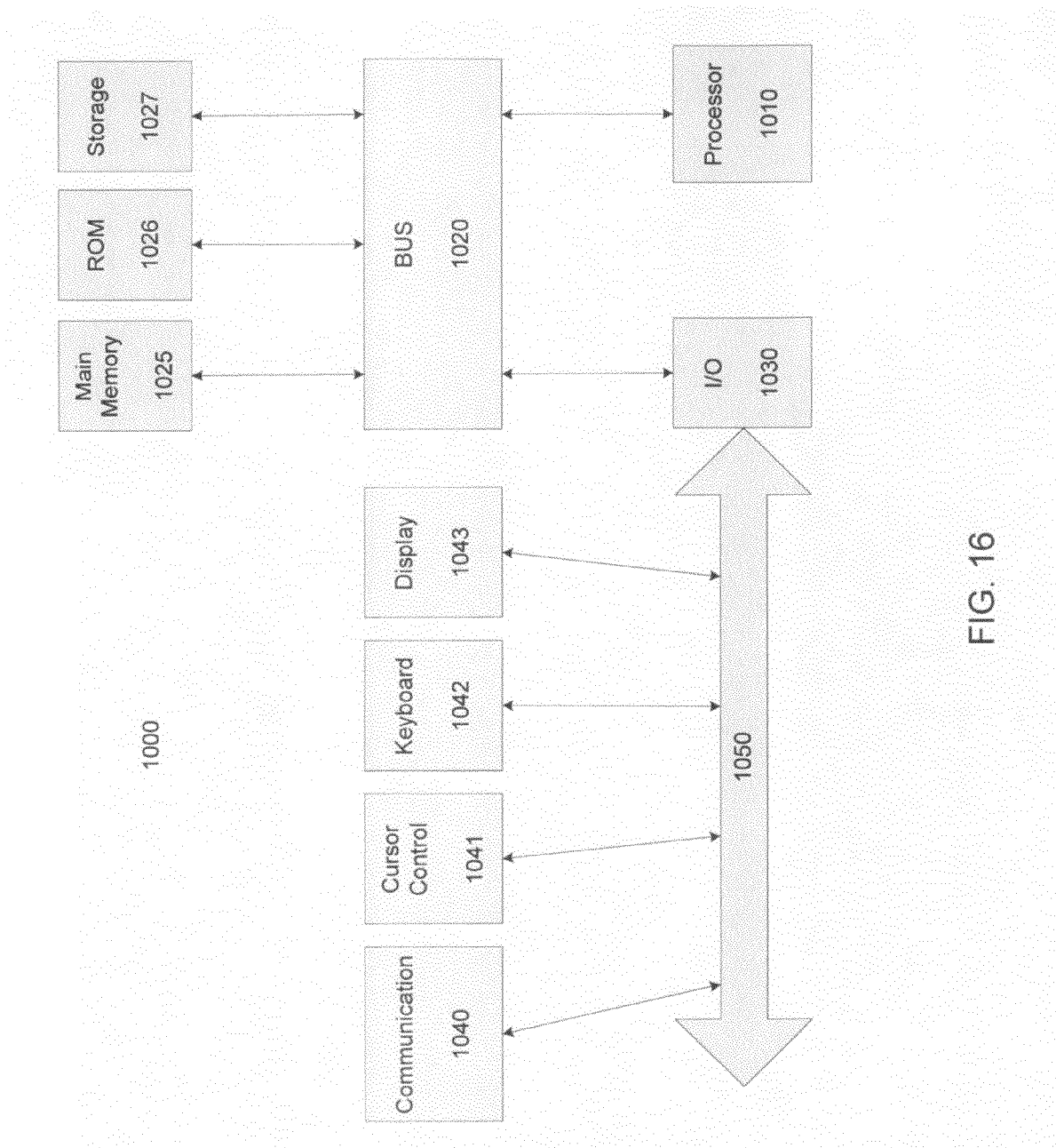
FIG. 16 is a block diagram of an exemplary computer architecture for use with the present system, according to one embodiment of the present invention.

As desired, the method for refinement of segmentation using spray paint markup may be executable on a conventional general-purpose computer (or microprocessor) system. Additionally, or alternatively, the method for refinement of segmentation using spray paint markup may be stored on a conventional storage medium for subsequent execution via the general-purpose computer. FIG. 16 is an illustration of an exemplary embodiment of an architecture 1000 of a computer system suitable for executing the method for refinement of segmentation using spray paint markup. Computer architecture 1000 is used to implement the computer systems or image processing systems described in various embodiments of the method for segmentation. As shown in FIG. 16, the architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010. Although the architecture 1000 is shown and described as having selected system elements for purposes of illustration only, it will be appreciated that the method for refinement of segmentation using spray paint markup can be executed by any conventional type of computer architecture without limitation.

A data storage device 1027 such as a magnetic disk or optical disk and its corresponding drive is coupled to computer system 1000 for storing information and instructions. The data storage device 1027, for example, can comprise the storage medium for storing the method for segmentation for subsequent execution by the processor 1010. Although the data storage device 1027 is described as being magnetic disk or optical disk for purposes of illustration only, the method for refinement of segmentation using spray paint markup can be stored on any conventional type of storage media without limitation.

Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed is:

1. A method comprising:
receiving a binary mask associated with a segmentation of an image;
receiving a user selection, via a user input device, of a portion of said image to be corrected;
creating a binary markup mask associated with said user selection; and
applying said binary markup mask to said binary mask associated with said segmentation of said image to revise said binary mask associated with said segmentation of said image to locate errors in said segmentation using said binary markup mask.

2. The method as described in claim 1, wherein said user selection is a spray paint, and wherein said user input device is a computer mouse.

3. The method as described in claim 1, wherein said creating comprises:
rasterizing samples associated with said user selection to create a binary trajectory mask;
smoothing said binary trajectory mask to create a fuzzy markup mask; and
enabling positive pixels in said fuzzy markup mask to create said binary markup mask.

4. The method as described in claim 1 further comprising:
determining uncertainty associated with said user selection, wherein said uncertainty is based on a width of a graphical rendition on a graphical user interface that is associated with said user input device, and wherein said uncertainty is further based on sloppiness associated with said user selection.

5. The method as described in claim 1 further comprising:
determining uncertainty associated with said user selection based on Gaussian random processes.

6. The method as described in claim 1 further comprising:
determining said revision to be associated with addition if a ratio of an overlap region between said image and said user selection is smaller than a first threshold;
determining said revision to be associated with deletion if said ratio of said overlap region is larger than a second threshold; and
determining said revision to be associated with refinement if said ratio of said overlap region is larger than said first threshold and smaller than said second threshold.

7. A non-transitory computer readable storage medium having computer-readable program code stored thereon for causing a processor to implement a method comprising:
receiving a binary mask associated with a segmentation of an image;
receiving a user selection, via a user input device, of a portion of said image to be corrected;
creating a binary markup mask associated with said user selection;
applying said binary markup mask to said binary mask associated with said segmentation of said image to revise said binary mask associated with said segmentation of said image; and
determining uncertainty associated with said user selection, wherein said uncertainty is based on a width of a graphical rendition on a graphical user interface that is associated with said user input device, and wherein said uncertainty is further based on sloppiness associated with said user selection.

8. The non-transitory computer readable storage medium as described in claim 7, wherein said user selection is a spray paint, and wherein said user input device is a computer mouse.

9. The non-transitory computer readable storage medium as described in claim 7, wherein said creating comprises:
rasterizing samples associated with said user selection to create a binary trajectory mask;
smoothing said binary trajectory mask to create a fuzzy markup mask; and
enabling positive pixels in said fuzzy markup mask to create said binary markup mask.

10. The non-transitory computer readable storage medium as described in claim 7, wherein said method further comprises:
determining uncertainty associated with said user selection based on Gaussian random processes.

11. The non-transitory computer readable storage medium as described in claim 7, wherein said method further comprises:
locating errors using said binary markup mask.

12. The non-transitory computer readable storage medium as described in claim 7, wherein said method further comprises:
determining said revision to be associated with addition if a ratio of an overlap region between said image and said user selection is smaller than a first threshold;
determining said revision to be associated with deletion if said ratio of said overlap region is larger than a second threshold; and
determining said revision to be associated with refinement if said ratio of said overlap region is larger than said first threshold and smaller than said second threshold.

13. A computer system comprising:
a processor;
a display; and
a memory coupled to said processor and said display, wherein said memory comprises computer-readable program code stored thereon for causing said processor to implement a method comprising:
receiving a binary mask associated with a segmentation of an image;
receiving a user selection, via a user input device, of a portion of said image to be corrected;
creating a binary markup mask associated with said user selection;
applying said binary markup mask to said binary mask associated with said segmentation of said image to revise said binary mask associated with said segmentation of said image; and
determining uncertainty associated with said user selection based on Gaussian random processes.

14. The computer system as described in claim 13, wherein said creating comprises:
rasterizing samples associated with said user selection to create a binary trajectory mask;
smoothing said binary trajectory mask to create a fuzzy markup mask; and
enabling positive pixels in said fuzzy markup mask to create said binary markup mask.

15. The computer system as described in claim 13, wherein said method further comprises:
determining uncertainty associated with said user selection, wherein said uncertainty is based on a width of a graphical rendition on a graphical user interface that is associated with said user input device, and wherein said uncertainty is further based on sloppiness associated with said user selection.

16. The computer system as described in claim 13, wherein said method further comprises:

locating errors using said binary markup mask.

17. The computer system as described in claim 16, wherein said method further comprises:

determining said revision to be associated with addition if a ratio of an overlap region between said image and said user selection is smaller than a first threshold;

determining said revision to be associated with deletion if said ratio of said overlap region is larger than a second threshold; and determining said revision to be associated with refinement if said ratio of said overlap region is larger than said first threshold and smaller than said second threshold.

* * * * *